R. Gipson,
Washing Machine.

Nº 43,580.　　　　Patented July 19, 1864.

Witnesses
W. H. Burridge
~ Holmes,

Inventor
Reuben Gipson

UNITED STATES PATENT OFFICE.

REUBEN GIPSON, OF SHELBY, OHIO.

IMPROVED WASHING-MACHINE.

Specification forming part of Letters Patent No. 43,580, dated July 19, 1864.

*To all whom it may concern:*

Be it known that I, REUBEN GIPSON, of Shelby, in the county of Richland and State of Ohio, have invented new and useful Improvements in Washing-Machines; and I do hereby declare that the following is a full and complete description of the construction and operation of the same, reference being had to the accompanying drawings, making part of this specification, in which—

Figure 1:
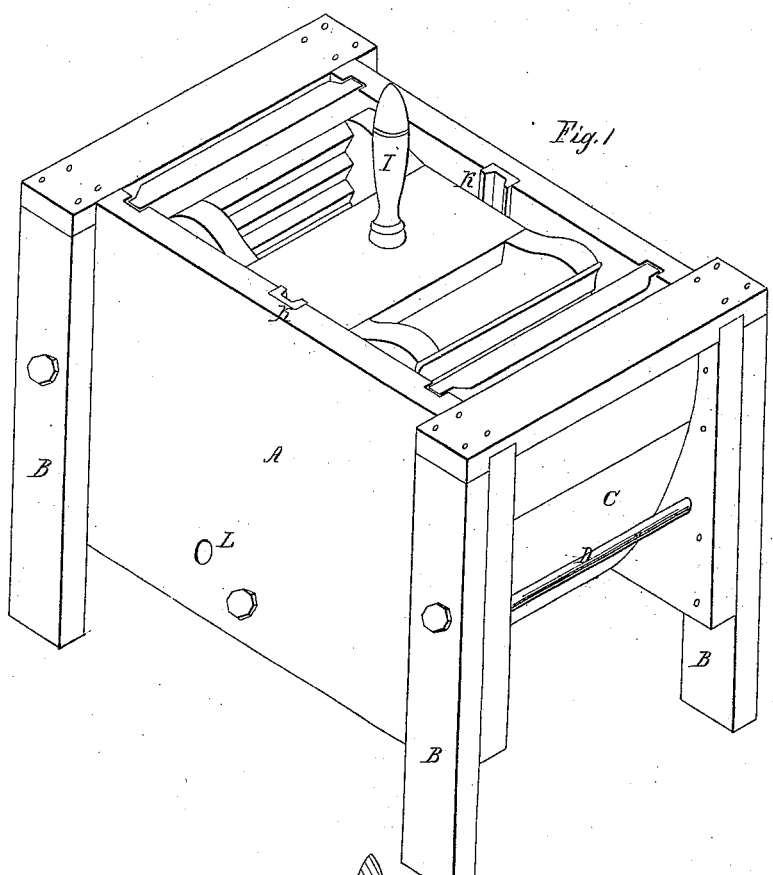
Figure 2:
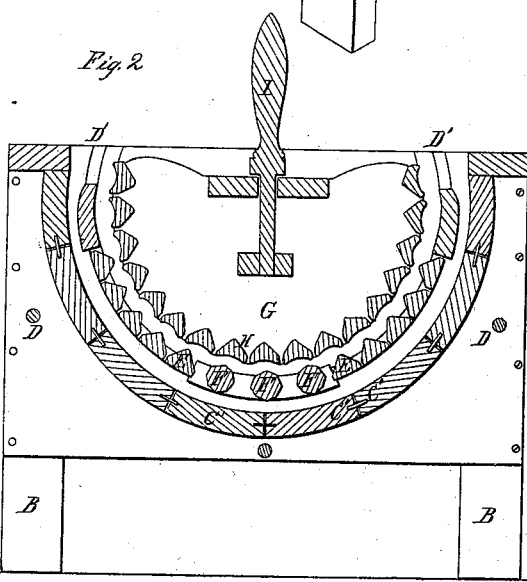

Figure 1 is a perspective view, and Fig. 2 is a transverse vertical section.

Like letters refer to like parts in the different views.

The body of the machine consists of two side boards, A A, posts or legs B, and semicircular bottom C. The side pieces A are grooved upon the inside to receive the semicircular bottom C, and the two sides are held together by rods D, or otherwise. The semicircular bottom consists of narrow staves, C', the ends of which fit into grooves in the inner face of the side pieces. The staves C' are united together by means of narrow strips of sheet metal, (zinc is preferred,) which fit into thin grooves, as shown at C'' in Fig. 2. In preparing these staves they are all made of the right width, bevel, and curve. The edges are then grooved with a circular saw, or by other means. I then unite the whole series by means of the thin metal plates above described, which accurately fit the grooves, the same metallic plate extending into two staves. In this way the joints can be made perfectly tight, and do not become open by shrinking of the wood of which the staves are made. The inside of the tub is provided with grooves D' at the distance of about an inch from the inner surface of the curved bottom C, into which are inserted the bars E. These are triangular in form, having one of their angles looking toward the center of the circle described by the circular bottom C. The ends of these bars are so formed as to accurately fit the groove D', but not so tight but that they can be readily moved in either direction, and be taken out and replaced at pleasure. At the center or lowest point of the curve or semicircular bottom I introduce three rollers, F, (more or less may be used.) The journals of of these rollers work in boxes that slide easily into the grooves D', and can, with the rollers, be easily removed and replaced. A vibrating rubber, G, also semicircular or half-cylindrical in form, but of less radius than the groove D', and provided with journals which fit into slotted boxes or guides K, is placed within the tub, as shown in Fig. 2. The half-cylindrical surface of this rubber is provided with concave bars H, which have their concave surface looking outward from the center, or facing the bars E and rollers F. The bars H are an inch or more in width, and are firmly secured to the end pieces of the rubber G, leaving about one-quarter of an inch space between them, thus forming a kind of fluted surface, the central space between the end pieces of the rubber G being open. With this arrangement of the slotted boxes K the whole weight of the rubber will rest upon whatever substance intervenes between the bars E, rollers F, and fluted bars H, the rubber rising and falling with the quantity of clothes between the rubber and the rollers and bars. The rubber is vibrated back and forth by means of a handle, I, which is inserted into cross-pieces J J', which, with the bars H, secures the end pieces of the rubber together. The slotted boxes K are fitted into the sides A in a line representing a vertical radius of the circle D', and the slots pass the center, so that the surface of the rubber will nearly come in contact with the rollers F when nothing intervenes. A hole, L, is formed in the side A, just above the bottom C, for the discharge of water from the tub.

In using this machine the rubber is lifted out of its place. The suds and clothes are then introduced and the rubber replaced. Now, by taking hold of the handle I a vibratory motion is given to the rubber, the weight of which rests upon the clothes, the vibration of the rubber causing the desired friction upon the garments. When these have been sufficiently washed, the rubber is lifted from its place and the clothes removed.

For the purpose of cleaning, drying, or repairing, the bars E and rollers F can be removed and replaced at pleasure. The rollers F F F and bars E E, &c., are a sufficient distance apart to allow a free circulation of the suds below the bars.

What I claim as my improvement, and desire to secure by Letters Patent, is—

1. Uniting the staves C' by means of a plate, as shown at C'', for making the concave bottom C, as herein specified.

2. In combination with the staves C' and plates C'', the rollers F F F, bars E E, arranged in grooves D D, in connection with the adjusting rubber G, having concave bars H H, the several parts being arranged and operating substantially in the manner and for the purposes set forth.

REUBEN GIBSON.

Witnesses:
W. H. BURRIDGE,
I. HOLMES.